Figures 1, 2, 3:
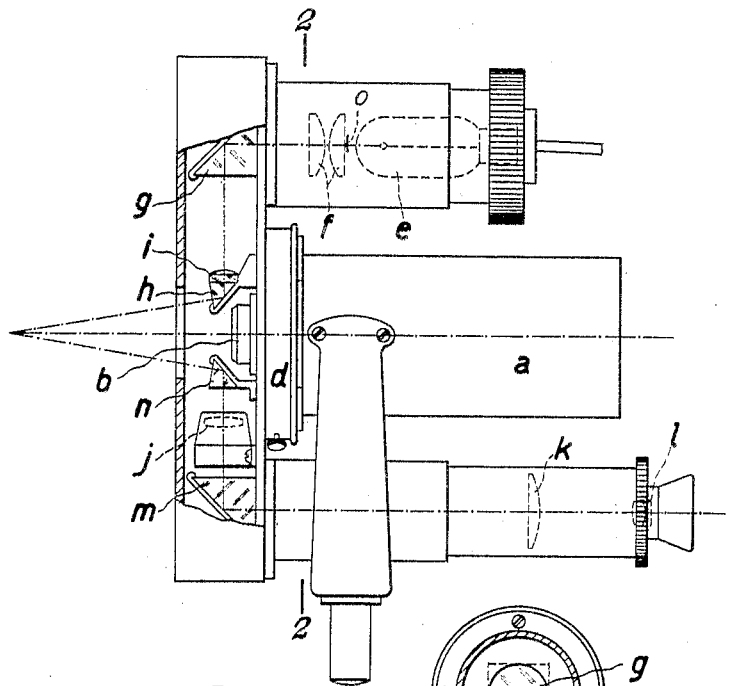

May 27, 1930.  F. PFEIFFER ET AL  1,760,208
CAMERA FOR PHOTOGRAPHING THE EYEBALL
Filed March 21, 1928

Inventors:
Franklin Pfeiffer
Theodor Kuhl

Patented May 27, 1930

1,760,208

UNITED STATES PATENT OFFICE

FRANKLIN PFEIFFER AND THEODOR KÜHL, OF JENA, GERMANY, ASSIGNORS TO THE FIRM CARL ZEISS, OF JENA, GERMANY

CAMERA FOR PHOTOGRAPHING THE EYEBALL

Application filed March 21, 1928, Serial No. 263,546, and in Germany April 6, 1927.

The photographing of the eyeball by which in particular the aspect of the iris is to be fixed has hitherto involved some difficulty because by the reflexion of the laterally disposed source of light at the cornea, i. e. by the so-called corneal reflexion the iris was partly covered, so that only an imperfect image of the same was obtained.

According to the present invention it is possible to render harmless the reflexion of the source of light at the cornea for photographing the iris by disposing on the camera beside the photographic lens a reflecting surface and by throwing the pencil of illuminating rays on this reflecting surface. After a suitable adjustment of the source of light and the mirror the pencil of illuminating rays is transmitted from the reflecting surface to the eye to be photographed approximately parallel to the optical axis of the camera. Also with this direction of incidence of the pencil of illuminating rays there still takes place a corneal reflexion but, if the device be properly adjusted relatively to the eye to be photographed, this occurs at a place which is harmless for the photographing of the iris, viz, in front of the eye-pupil. If, on the other hand, it be desired to photograph just the part of the cornea, lying in front of the pupil of the eye, it is only necessary to set up somewhat laterally the camera with the source of light. In that case the part of the cornea, lying in front of the pupil, remains free from objectionable reflexions.

In order to facilitate the relative adjustment of the source of light, the mirror, the camera and the eye to be photographed, the illuminating device should be rigidly connected to the camera.

If the illumination of the eye be attained by means of a bright surface, which is imaged into the eye, by a projection system, it is possible to entirely remove with the new device the corneal reflexion by disposing on the bright surface a circular stop whose image, produced by the projection system, is thrown upon the eyeball. In that case the place at which otherwise the corneal reflexion would take place, is not illuminated at all.

In order to always be able to adjust the camera and the source of light prior to the photographing in such a way that no light, reflected by an undesirable part of the cornea, enters the photographic lens of the camera, the latter is suitably connected with a finder to which appertains a light-entrance mirror, disposed in the vicinity of the photographic lens.

The annexed drawing shows as a constructional example a stereoscopic camera according to the invention.

Fig. 1 represents a side elevation of this camera, partly in a section, Fig. 2 a section on the line 2—2 of Fig. 1 and Fig. 3 a front view of a single part.

The apparatus shown consists of a camera-casing $a$ whose front is provided with two photographic lenses $b$ and $c$. To the casing $a$ there is rigidly connected an illuminating device and a finder. The illuminating device contains a glow lamp $e$, a condenser $f$, two prisms $g$ and $h$ as well as a projection lens $i$ which produces an image of the aperture of the condenser on the eye to be photographed. Of the prisms $g$ and $h$ the latter is cemented to the lens $i$ and disposed between the two photographic lenses $b$ and $c$. The finder contains an objective $j$, an ocular $k$, $l$ and two prisms $m$ and $n$, of which the latter is again disposed between the two photographic lenses $b$ and $c$. On the surface, facing the projection lens $i$, of the condenser $f$ there is disposed a stop $o$ being a black spot (Fig. 3) whose image, produced by the lens $i$, is thrown into the pupil of the eye to be photographed.

We claim:

1. Camera for photographing the eyeball, comprising a casing, an objective fixed on the casing, a source of light fixed on the casing and a mirror fixed on the casing in the vicinity of the said objective and adapted to transmit light, emerging from the source of light, approximately parallel to the axis of the said objective to the eye to be photographed.

2. Camera for photographing the eyeball, comprising a casing, an objective fixed on the casing, a source of light fixed on the casing, a mirror fixed on the casing in the vicinity of the said objective and adapted to transmit light, emerging from the source of light, approximately parallel to the axis of the said objective to the eye to be photographed, and two collective lens systems lying between the source of light and the said mirror, the first of these systems being adapted to image the source of light approximately at the locus of the second system, and this second system being adapted to image the first one on the eye to be examined.

3. In a camera according to claim 2, a stop disposed in the middle of the said first collective system.

4. Camera for photographing the eyeball, comprising a casing, an objective fixed on the casing, a source of light attached to the casing, a mirror fixed on the casing in the vicinity of the said objective and adapted to transmit light, emerging from the source of light, approximately parallel to the axis of the said objective to the eye to be photographed, and a finder fixed on the casing and having its look-out aperture in the vicinity of the said objective.

5. Camera for photographing the eyeball, comprising a casing, an objective fixed on the casing, a source of light attached to the casing, a mirror fixed on the casing in the vicinity of the said objective and adapted to transmit light, emerging from the source of light, approximately parallel to the axis of the said objective to the eye to be photographed, and a finder fixed on the casing, this finder comprising a telescope and a prism system, adapted to deflect the traversing luminous rays, the look-out aperture of the finder lying in the vicinity of the said objective.

6. Stereoscopic camera for photographing the eyeball, comprising a casing, two objectives fixed adjacent to each other on the casing, a source of light attached to the casing, and a mirror fixed on the casing in the plane, traversing between the said objectives in the vicinity of these objectives and adapted to transmit light, emerging from the source of light, approximately parallel to the axis of the said objective to the eye to be photographed.

7. Stereoscopic camera for photographing the eyeball comprising a casing, two objectives fixed adjacent to each other on the casing, a source of light attached to the casing, a mirror fixed on the casing in the plane, traversing between the said objectives in the vicinity of these objectives and adapted to transmit light, emerging from a source of light, approximately parallel to the axis of the said objective to the eye to be photographed, and a finder fixed on the casing and having its look-out aperture in the said plane in the vicinity of the objectives.

8. Stereoscopic camera for photographing the eyeball comprising a casing, two objectives fixed adjacent to each other on the casing, a source of light attached to the casing, a mirror fixed on the casing in the plane, traversing between the said objectives in the vicinity of these objectives and adapted to transmit light, emerging from a source of light, approximately parallel to the axis of the said objective to the eye to be photographed, and a finder fixed on the casing, this finder containing a telescope and a prism system, adapted to deflect the traversing luminous rays, the look-out aperture of the finder lying in the said plane in the vicinity of the objectives.

FRANKLIN PFEIFFER.
THEODOR KÜHL.